UNITED STATES PATENT OFFICE.

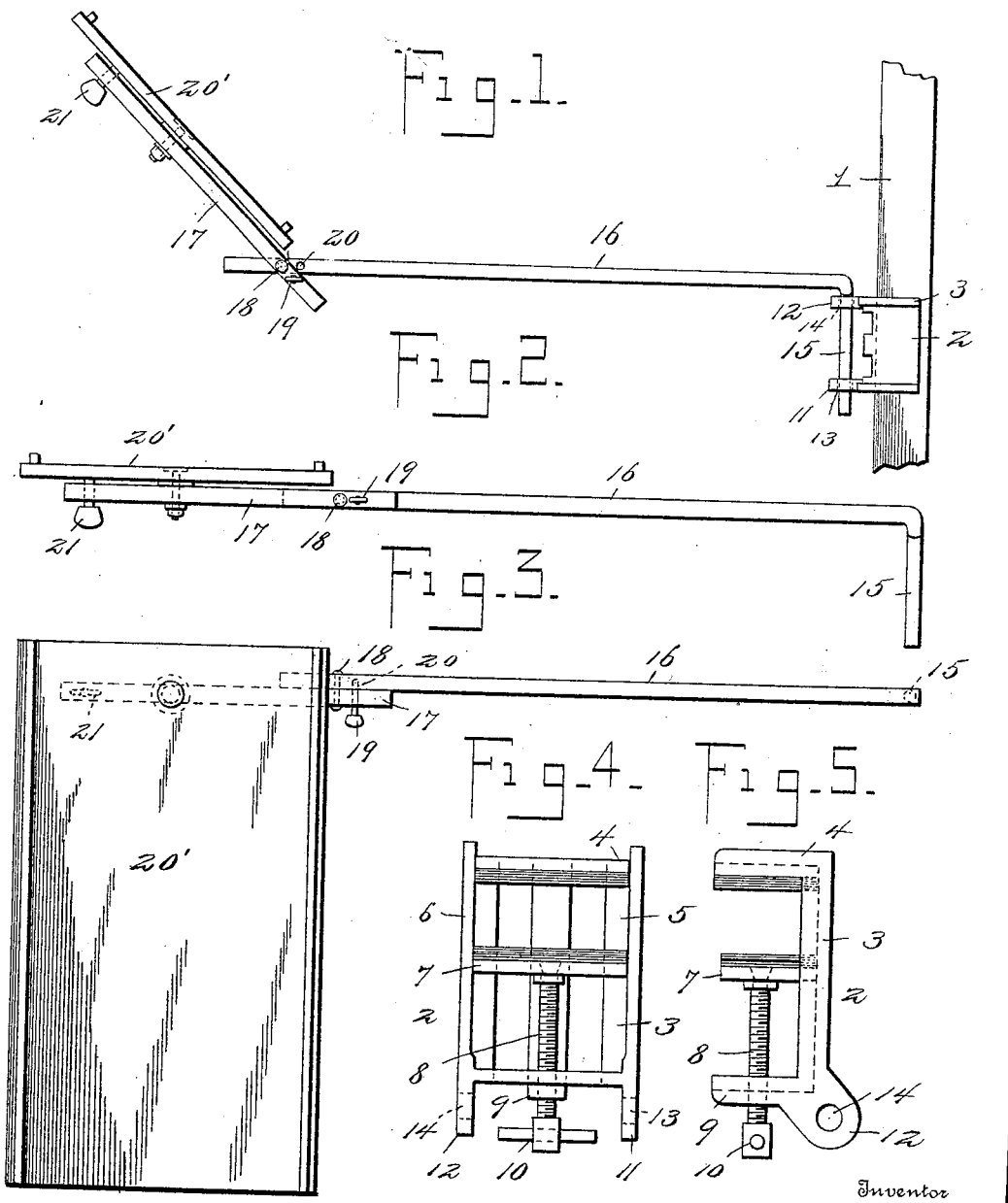

WILLIAM B. YOUNG, OF ALBION, NEW YORK, ASSIGNOR OF ONE-FOURTH TO GEORGE T. S. FOOTE, OF ALBION, NEW YORK.

COMBINED READING AND INVALID TABLE.

No. 822,809.  Specification of Letters Patent.  Patented June 5, 1906.

Application filed September 27, 1902. Renewed March 31, 1906. Serial No. 309,130.

*To all whom it may concern:*

Be it known that I, WILLIAM B. YOUNG, a citizen of the United States, residing at Albion, in the county of Orleans and State of New York, have invented new and useful Improvements in a Combined Reading and Invalid Table, of which the following is a specification.

This invention relates to a combined reading and invalid table; and the object of the invention is to provide an efficient and durable device which may be converted from a table into a book-support or similar device.

The peculiar manner of accomplishing the desired result will be specifically described hereinafter, reference being had to the accompanying drawings, in which—

Figure 1 is a side elevation of the device applied to a vertical support and arranged to form a reading-table. Fig. 2 is a side elevation of a table detached from a clamp and arranged to form an invalid's table. Fig. 3 is a top plan view of the same. Fig. 4 is a front elevation of a clamp, and Fig. 5 is a top plan view of the same.

The reference-numeral 1 designates a suitable support, preferably one of the side posts of a bed, to which is secured a clamp 2. This clamp comprises a horizontally-arranged bar 3, on one end of which is a right-angular projecting extension 4, forming a rigid jaw. The sides of the bar 3 are provided with inwardly-extending flanges 5 and 6, between which is slidably secured a movable jaw 7, designed to be operated by a screw 8, working in a threaded opening in the laterally-projecting arm 9, arranged parallel with the jaw 4. The screw 8 can be operated by a suitable handle 10 on the free end thereof. From the respective flanges 5 and 6 project parallel ears 11 and 12, which are formed with coinciding openings 13 and 14, for the reception of a vertical arm 15 of the elongated bar 16, which forms a support for the table.

The arm 15 is seated in the openings 13 and 14, so that the bar may swing laterally and at right angles to its support. Pivoted to the extremity of the bar 16 is a second bar 17, which is secured by a suitable bolt or other fastening means 18. Projecting through the bar 17, near one end thereof, is a pin 19, which is adapted to enter an opening 20 in the bar 16, so as to hold the bar 17 in alinement therewith, forming practically a continuation thereof.

Intermediate the ends of the bar 17 is pivotally secured a turn-table 20', which can be held rigid in a transverse position, as shown in Fig. 3, by a set-screw 21 or can be swung around longitudinal of the bar 16 and secured by set-screw 21.

When the device is to be used as a table, it will be positioned, as shown in Fig. 2, and can be swung in the bracket, so as to be conveniently near the occupant of the bed. When it is desired to use the device as a reading-table, the pin 19 will be withdrawn from the opening 20 in the bar 16 and projected through the opening in the bar 17, so that it will rest under the bar 16, holding the bar 17 and the table in a slanting position, where it will be held until the pin 19 is withdrawn.

In order to obviate the liability of marring the wood of the support 1, I provide buffers of suitable material which are secured to the respective jaws 4 and 7. These buffers can be of any suitable material, so that no mark will be made on the post by changing the position of the clamps.

Having described my invention, what I claim is—

A combined reading and dining table comprising a horizontal bar having a pivotally-mounted vertical arm, a supplementary bar pivotally mounted on the outer end of the horizontal bar, a support or table pivotally mounted on the supplementary bar, means movably secured on the outer end of the supplementary bar and coacting with the under surface of the table to prevent rotation of the same, means for securing the supplemental bar in a straight line with the horizontal bar, said means also serving in connection with the under side of the horizontal bar to raise the table to an inclined position, substantially as specified.

In testimony whereof I affix my signature in presence of the witnesses.

WILLIAM B. YOUNG.

Witnesses:
 GEORGE BEACH,
 WARNER THOMPSON,
 S. S. SPENCER.